United States Patent [19]

Hoskin et al.

[11] Patent Number: 4,660,640
[45] Date of Patent: Apr. 28, 1987

[54] POLYSILICATE ESTERS FOR OIL RESERVOIR PERMEABILITY CONTROL

[75] Inventors: Dennis H. Hoskin, Lawrenceville; Louis D. Rollmann, Princeton, both of N.J.

[73] Assignee: Mobil Oil Corporation, New York, N.Y.

[21] Appl. No.: 697,098

[22] Filed: Feb. 1, 1985

[51] Int. Cl.$^4$ ........................................... E21B 33/138
[52] U.S. Cl. .................................... 166/270; 166/294; 166/295; 166/300
[58] Field of Search ............... 166/270, 292, 294, 295, 166/300; 405/263, 264

[56] References Cited

U.S. PATENT DOCUMENTS

| 2,259,875 | 10/1941 | Bent et al. | 166/294 X |
| 2,281,810 | 5/1942 | Stone et al. | 166/294 X |
| 2,618,570 | 11/1952 | Blackburn | 405/264 X |
| 2,747,671 | 5/1956 | Nowak et al. | 166/295 |
| 2,816,610 | 12/1957 | Fisher | 166/270 X |
| 3,626,699 | 12/1971 | Lees et al. | 405/263 |
| 3,656,550 | 4/1972 | Wagner, Jr. et al. | 166/270 |
| 3,805,893 | 4/1974 | Sarem | 166/270 |
| 3,811,508 | 5/1974 | Friedman | 166/294 X |
| 4,009,755 | 3/1977 | Sandiford | 166/270 |
| 4,069,869 | 1/1978 | Sandiford | 166/270 |
| 4,275,789 | 6/1981 | Lawrence et al. | 166/294 |
| 4,413,680 | 11/1983 | Sandiford | 166/270 |
| 4,417,623 | 11/1983 | Anthony | 166/294 |

Primary Examiner—George A. Suchfield
Attorney, Agent, or Firm—Alexander J. McKillop; Michael G. Gilman; Stanislaus Aksman

[57] ABSTRACT

The permeability of subterranean oil-bearing formations is controlled by injection of an organic polysilicate ester. The ester may be derived from simple, monohydroxylic alcohols such as methanol, ethanol, propanol or butanol, from diols such as ethylene glycol, from polyols such as glycerol and alkylene oxide polymerization products and from other organic compounds containing function hydroxy groups, for example, partial ethers and esters of glycols and polyols. The polysilicates are injected into a formation through injection wells, suitably in an amount from 10 to 100% of the pore volume of the zone to be treated. In the formation, the polysilicate esters form gels which selectively plug the high permeability regions of the formation, to divert the flow of flooding liquid used in flooding operations to the less permeable regions of the formation.

20 Claims, No Drawings

POLYSILICATE ESTERS FOR OIL RESERVOIR PERMEABILITY CONTROL

FIELD OF THE INVENTION

This invention relates to the control of permeability in subterranean oil-bearing formations.

BACKGROUND OF THE INVENTION

In the production of oil from subterranean oil reservoirs by various flooding techniques, especially waterflooding, it has become a common expedient to add various polymeric thickening agents to the water in order to increase its viscosity to a point where it approaches that of the crude oil which is to be displaced so as to improve the displacement of the oil from the reservoir. The use of polymers for this purpose is often stated to be for mobility control.

Another problem which arises in the various flooding processes is that different strata or zones in the reservoir often possess different permeabilities so that displacing fluids enter the high permeability or "thief" zones in preference to zones of lower permeability where significant quantities of oil may be left unless measures are taken to plug the high permeability zones wholly or partly and so divert the displacing fluid into the low permeability zones. Mechanical isolation of the thief zones has been tried but vertical communication among reservoir strata often renders such measures ineffective. Physical plugging of the high permeability zones by cements and solid slurries has also been attempted with varying degrees of success but here, one serious drawback is the possibility of permanently closing still productive horizons.

From these early experiences, the desirability of designing a viscous slug capable of sealing off the most permeable layers so that the floodwater would be diverted to the underswept, tighter regions of the reservoir, became evident. This has led to the use of oil/water emulsions, gels and polymers for controlling the permeability of the formations in a process frequently referred to as "profile control", a reference to the control of the vertical permeability profile of the reservoir. Profile control agents which have been proposed have included oil/water emulsions, gels, e.g. lignosulfonate gels and polymers, with polymers being the most extensively applied in recent years.

Among the polymers so far examined for improving waterflood conformance are polyacrylamides, polysaccharides, celluloses, furfural-alcohol and acrylic/epoxy resins, silicates and polyisocyanurates, as described, for example, in U.S. Pat. Nos. 4,009,755, 4,069,869 and 4,413,680. These organic polymers may be used in either their uncrosslinked forms or as crosslinked metal complexes, e.g. as described in the patents previously mentioned.

One problem which has persisted with the use of the various organic polymers as permeability control agents is that their stability may not be wholly satisfactory at all the elevated temperatures commonly encountered in oil-bearing formations. There is therefore a continuing need for materials which will block the high permeability regions of oil-bearing formations over an extended range of temperatures, particularly in reservoirs which are at a high temperature.

Proposals have been made for the use of inorganic polymers, especially silicates, as permeability control agents and proposals have been made for the use of inorganic silicates in this way. For example, U.S. Pat. Nos. 4,009,755 and 4,069,869 disclose the use of inorganic silicates for this purpose. In the permeability control method described in these two patents, an organic polymeric permeability control agent such as a crosslinked polyacrylamide or polysaccharide is first injected into the reservoir, followed by an aqueous solution of an alkaline metal silicate and a material that reacts with the silicate to form a silicate gel which plugs the high permeability regions in the formation. An alkaline metal silicate is typically used as the source of silica and the gelling agent is usually an acid or acid forming compound such as a water soluble ammonium salt, a lower aldehyde, an aluminum salt or an alkaline metal aluminate.

The problem, however, with many inorganic silicates is that their solutions are often quite viscous and stable only under alkaline conditions. As soon as conditions approach non-alkalinity, silicate gel is formed. Although this is the desired reaction for plugging the formation, it may occur prematurely, before the solution has had an adequate opportunity to enter the high permeability regions of the formation, cutting off the possibilities for further injection of plugging material. This is obviously undesirable and it would represent a distinct improvement if the silicates could be made more stable under a wider range of pH conditions. The use of silica sols has been considered but these often contain particles with diameters in excess of 10 microns, too large to penetrate many reservoir rock pores.

SUMMARY OF THE INVENTION

It has now been found that organic polysilicate esters are suitable materials for the control of permeability in subterranean, oil-bearing formations. These polysilicates offer a small, reproducible silica "particle" size in the sense that it is possible to produce polysilicates which do not contain gel particles larger than a predetermined size; they have a controlled gelation period which is adequately long for proper placement in the reservoir; they are stable under a wide range of conditions and temperature and pH. In many cases, their solutions have a satisfactorily low viscosity, enabling them to be injected into the formation without the use of excessive injection pressures.

According to the present invention, therefore, a method for controlling the permeability of a subterranean, oil-bearing formation employs an organic polysilicate ester which is injected into the formation where it enters the regions of high permeability to form a siliceous plug which blocks the high permeability regions.

DETAILED DESCRIPTION

Methods for the control of permeability in subterranean, oil-bearing formations are used in conjunction with flooding operations in which a flooding liquid, usually water, is injected into the formation through injection wells which extend from the surface of the earth into the formation. The flooding liquid displaces the oil from the formation towards a production well which is situated at a horizontal distance or offset from the injection well. In practice, a number of injection and production wells will be used in a given field, arranged in conventional patterns such as a line drive, five spot or inverted five spot, seven spot or inverted seven spot. Because the flooding liquid will tend to pass preferentially through the high permeability regions and leave the low permeability or "tight" zones unswept, it is desirable to plug the high permeability regions and any fractures which may be present with the permeability control agent. This is done by injecting the permeability control agent through the injection well in a slug, to form a plug in the high permeability regions. The permeability control agent forms a gel-like precipitate or plug in the formation and this diverts the flooding liquid to the tight zones, to displace the oil from them. The plug should, of course, have adequate stability, both in terms of mechanical strength since it is necessary for the plug to resist the pressures which will be applied during the subsequent flooding step by the injection of the flood liquid and it should also possess adequate chemical stability under the reservoir conditions which are encountered. In addition, a selected permeability control agent must be capable of being injected into the reservoir through the injection well and this means that it must be capable of being pumped through the equipment which is available.

According to the present invention, the permeability control agents which may be used are the polysilicate esters of organic alcohols and other organic compounds containing functional hydroxyl groups. Thus, the polysilicate esters may be esters of simple alcohols such as methyl, ethyl, n-propyl, iso-propyl, n-butyl, sec-butyl, tert-butyl, with polyols such as ethylene glycol, 1,2-propylene glycol, 1,3-propylene glycol or higher glycols and higher polyols such as glycerol. Polymeric alcohols may also be used to form the esters, for example polyvinyl alcohol and polymeric alkylene oxides with terminal hydroxyl groups. Other organic compounds which contain functional hydroxyl groups may also be employed, for example, alkanolamines such as monoethanolamine, diethanolamine and triethanolamine and the partial ethers and esters of glycols and higher polyols, for example, hydroxyl-containing alkoxy ethers and alkanoletherates such as the monoalkylethers of ethylene glycol, e.g. ethylene glycol monomethyl ether, 2-(2-methoxyethoxy)ethanol, ethylene glycol monoethyl ether, ethylene glycol monobutyl ether, ethylene glycol monohexyl ether and ethylene glycol monophenyl ether, which are commercially available under the "Cellosolve" trademark. Internal alcohols such as the ethoxylated alcohols, e.g. ethoxylated glycols and glycerols and epichlorohydrin derivatives and glycol oligomers, may also be used.

The polysilicate esters may conveniently be produced by reacting the selected hydroxyl group-containing compound with an acidified solution of an alkali metal silicate, usually sodium silicate. Solutions of this kind may be regarded as solutions of polysilicic acid, the degree of polymerization depending upon the composition of the original silicate solution and the acidification conditions employed, particularly the rate of acidification. The alkali metal silicates are used in the form of aqueous solutions of the silicate, commonly available as "water glass". These solutions may be of varying composition, depending upon the $Na_2O:SiO_2$ ratio of the silicate. Generally, this ratio will vary within the range 2:1 to 1:3.75 (molar, as oxide), determined by the ratio of soda ash to silica used in the production of the silicate. For the present purposes, it is generally preferred to use less viscous silicate solutions of somewhat higher $Na_2O:SiO_2$ ratio as these produce esters which are more readily injected into a formation but which still generate adequate gel strength once correct placement within the high permeability regions of the formation has been achieved.

The solution of the alkaline metal silicate is acidified using an acid or an acid-forming reagent, preferably a mineral acid, for example, sulfuric acid, hydrochloric acid or nitric acid. Acidification is generally carried out under ambient conditions or with cooling, and with vigorous stirring to prevent the formation of a solid silica gel. Generally, the acidification will be carried out to pH values of 4.0 or lower, more usually 3.0 or lower. This will form a somewhat viscous solution which is then reacted with the desired alcohol to form the appropriate ester. Generally, reaction with the alcohol takes place readily with mild heating, to remove water and to drive the reaction to completion.

In addition, a transesterification may be used if a polysilicate ester is initially available; in this process, a compound containing hydroxyl (alochol) functionality is reacted with the initial polysilicate ester to effect an interchange of the organic groups. Polysilicate esters of varying molecular weight can also be produced by the controlled oligomerization and/or hydrolysis of an orthosilicate or of a polysilicate of lower molecular weight than the final desired polysilicate ester.

These and other methods of preparing the polysilicate esters are described in "The Chemistry of Silica", R. K. Iler, John Wiley & Sons, N.Y., 1979, to which reference is made, in its entirety, for a detailed description of such methods.

The resultant polysilicate esters may undergo reversible shear thinning during injection into the formation depending on their molecular weight, concentration and structure, and this property may be exploited in the placement of the slug of polysilicate ester, aided by the pressure gradient around the injection well. Around an injector, the flow rate and the associated pressure gradient are at a maximum; they drop off rapidly with radial distance from the wellbore. Thus, an injected polysilicate with non-Newtonian rheology will flow outwards from the injector. Its apparent viscosity will be initially low because of the high shear conditions which prevail in this regions and hence the slug can be readily injected. At a location sufficiently far away, say 10 m, the flow rate and pressure gradient are much reduced and the viscosity returns to its low shear, high volume. This increased viscosity arrests and in some instances, may halt the movement of the slug. The polysilicate then forms the final polymeric gel, blocking the regions of high permeability. However, the initial polysilicate may have a significant viscosity or may contain gel particles of a size which is comparable to that of the pores in the less highly permeable zones. Entry into these tight regions of a formation will then be prevented Thus, selective placement of the polysilicate into the more highly permeable regions would be ensured.

If desired, gel formation may be induced by injection of pH-altering or other coagulating materials such as brines containing in particular, fluoride or phosphate ions. In general, a modest upwards pH adjustment will accelerate gel formation. These materials may be included in the polysilicate slug or may precede or follow it into the formation.

In general, the amount of the polysilicate which is injected into the formation may be, for example, from about 10% to about 100% of the pore volume of the high permeability regions which are to be selectively plugged. The injected fluid may be proportioned into the various reservoir strata according to their effective permeabilities and flow capacities. The concentration of the polysilicate ester in the injected fluid will generally be from 10 weight % to 100 weight %, preferably at least 50 weight %. Aqueous solutions of the esters are preferred when solutions are used.

The invention is illustrated by the following Examples:

EXAMPLE 1

This Example illustrates the preparation of butyl polysilicate, by the procedures described in Indust. and Eng. Chem., Vol. 39, pages 1379-1384 (1947).

A solution of 388.5 g. sodium silicate (28.4% $SiO_2$, 8.7% $Na_2O$) in 569 g. water was added to cold, vigorously stirred sulfuric acid (855 ml., 7.35% strength) over a period of 10 minutes during which the temperature rose from 12° to 17° C. The pH of the mixture at the end of the addition was 1.67.

A quantity (678 ml) tert-butanol was then added. The temperature increased to 22° C. After cooling to 20° C., a virtually clear liquid was obtained. After adding 509 g. of NaCl, two phases separated. The upper phase was isolated and distilled with the continuous addition of n-butanol at a pressure of 30 torr (4 kPa) with pot temperatures ranging initially from 27.5° to 60° C. final. A total of 850 ml n-butanol was added and a total 1735 ml of alcohol and water was removed during the course of the distillation.

The t-butanol-free product was filtered through a coarse glass frit to yield 490 ml of a slightly cloudy liquid from which 17 gram of residue was removed by filtration. The remaining liquid was then distilled at atmospheric pressure in the presence of additional butanol at a final pot temperature of 115° to 119° C. After further filtration, the final butyl polysilicate product (397 g, 35.8%) was obtained as a solution in n-butanol.

EXAMPLE 2

This Example shows that the butyl polysilicate of Example 1 is a submicron silica species.

The butyl polysilicate liquid of Example 1 was passed first through a 1.0 and then a 0.6 micron Nucleopore (trademark) filter. In neither case was any observeable amount of material retained. The fresh material analyzed at 35% butyl polysilicate after removal of excess butanol at 150° C., the material which passed through the 1.0 micron filter, 35%, and that through the 0.6 micron filter, 34%.

EXAMPLE 3

This Example shows that the butyl polysilicate possesses sufficient temperature stability to permit injection into a subterranean reservoir formation.

Equal weights of the butyl silicate liquid of Example 1 and water were mixed and allowed to stand at 50° C. for varying lengths of time. After 17 hours, the filtrate through a 0.6 micron filter analyzed at 30% butyl polysilicate and after 38 hours, 28%. A gel was observed at 106 hours. Virtually the same results were obtained when water was replaced by a 22% NaCl/$CaCl_2$/$MgCl_2$ brine (wt. ratio 8.16/2.27/1.0). After 17 hours, the filtrate analyzed at 30% solids, after 38 hours, 30% solids and a gel had formed at 106 hours. In a third experiment when a phosphate buffer solution having a pH of 7 was substituted for brine, a gel formed in two to four hours.

EXAMPLE 4

This Example shows that a polysilicate ester solution can be easily concentrated.

The butyl polysilicate solution (150 g) of Example 1 was subjected to vacuum at room temperature and 65 g of n-butanol was removed overhead. The product was a very pale yellow, relatively low viscosity fluid containing 60% ester. In a separate experiment 1.59 g of the initial butyl polysilicate solution was evaporated just to dryness at 145° C., one atmosphere. The resultant very viscous fluid was soluble in acetone, indicating no degradation to $SiO_2$.

EXAMPLE 5

This Example shows that other alcohols can replace n-butanol in the synthesis.

To 204 g of the t-butanol phase of Example 1 were added 204 g of 2-(2-methoxyethoxy)ethanol (MEE) and 1 g Ba $Cl_2$. The butanol was distilled off under vacuum, beginning at room temperature. Another 100 g of MEE was added and distillation continued at 80° C., at about 2 mm pressure. A small amount of Filteraid (trademark) was added and the mixture was filtered to yield 294 g of light yellow liquid. The product was completely miscible with water, indicating formation of the desired ethoxylated polysilicate ester.

EXAMPLE 6

This Example shows the need for alcohol functionality.

The essential procedures of Example 5 were repeated except that 2-methoxyethyl ether was used in place of MEE. As the distillation temperature reached 50°-60° C., solid $SiO_2$ began to deposit out of solution. The ether could not form an ester and therefore could not stabilize the polysilicic acid species formed as the t-butanol was removed.

EXAMPLE 7

This Example shows that degree of esterification may alter the stability of polysilicates towards gelation.

The butylpolysilicate of Example 1 was 35.8% solids and analyzed as 51.08% C, 10.74% H, 10.55% O, and 22.7% $SiO_2$ (95.07% total; the O analysis being probably low). Correcting for the n-butanol solvent, this analysis corresponds to an alkyl: silica mole ratio of 0.56.

A commercially available polyethylsilicate (Polysciences, MW reported as 744 g. mole$^{-1}$) analyzed 34.46% C, 7.40% H, 8.34% O and 49.2% $SiO_2$, corresponding to an ethyl:silica ratio of 1.75.

The difference in degree of esterification is considered important in the observation that the butyl ester gelled in 2-4 hours at 50° C. with an equal volumn of a pH 7 phosphate buffer while the polyethylsilicate with Et/Si=1.75 required 20-23 hours at 90° C. with the same buffer (the polyethylsilicate was fluid after 20 hours, a loose gel after 23 hours and a solid gel after 42 hours). The butylpolysilicate preparation, on the other hand, formed a solid gel in about 0.5 hours under these conditions (phosphate buffer, 90° C.)

EXAMPLE 8

This Example describes another trans-esterification procedure for the preparation of various polysilicates.

A mixture of the polyethylsilicate of Example 7 (46 g), 2-(2-methoxyethoxy)ethanol (MEE, 50.8 g) and p- toluenesulfonic acid (0.11 g) was heated over about four hours from ambient temperature to 165° C. with concurrent ethanol distillation (18.2 g). The product liquid, unlike the starting polyethylsilicate, readily dissolved in water. An attempt to remove any excess MEE by stripping in vacuo yielded only 0.16 g of material overhead, indicating virtually complete reaction. In support of this assertion was the molar equivalency of MEE added (0.42 moles) to ethanol distilled over during reaction (0.40 moles). The $^{13}$C-NMR spectrum confirmed that the polysilicate ester contained 64% 2-(2-methoxyethoxy)ethoxy and 36% ethoxy sidechains.

EXAMPLE 9

This Example shows that the butyl polysilicate of Example 1 is capable of impeding flow when injected into a high permeability, unconsolidated sandstone.

A column (9 mm i.d., length 61 cm) was packed with 40-325 mesh (U.S. Standard) Berea sandstone, instrumented for pressure measurement at both ends of the column and for fluid flow and placed in a temperature bath at 50° C. After filling the column with the 22% brine solution used in Example 3, the sandpack permeability was about 4 darcy. At a brine flow rate of 4.5 cc. hr$^{-1}$ (12 ft/day) the pressure drop was 2.76 kPa (0.4 psi). One pore volume of the butyl polysilicate solution of Example 1 was injected, followed by 0.1 pore volumes of brine and the flow was then halted for 16 hours in order to permit adequate time for the gel to form. On injecting the polysilicate, the pressure drop decreased to 0.7 kPa (0.1 psi). After the 16 hour holding period, flushing with brine was resumed for several hours and the procedure was then repeated, except that following injection of the second slug of polysilicate solution, flow was halted over a weekend. At the start of the second polysilicate injection, the pressure drop was 4.1 kPa (0.6 psi) which increased to 27.6 kPa (4 psi) as the system was returned to brine. After the weekend, on resuming brine flow, the pressure drop was 96 kPa (14 psi) at a flow rate of 4.5 cc. hr$^{-1}$ and 13.8 kPa (2 psi) at a flow rate of 0.4 cc. hr$^{-1}$ (flow rates equivalent to 12 and 1 ft/day respectively).

EXAMPLE 10

This Example shows that the alcohol substituent affects the flow inhibiting properties of the polysilicate ester.

In addition to the comparison reported in Example 7 between the ethyl and butyl polysilicates, a comparison was made which showed that flow inhibition in a sandpack required much longer with the polyethyl than with the polybutylsilicate. A sandpack like that of Example 9 was filled with 22% brine solution. One pore volume of the polyethylsilicate ester was injected and flow was halted for 64 hours. A pressure drop of about 13.8 kPa (2 psi) was observed upon subsequent injection of several pore volumes of brine. After an additional 0.5 PV of polyethylsilicate was injected and shut in for 24 hours, a pressure drop in excess of 207 kPa (30 psi) was observed (12 ft/day brine).

EXAMPLE 11

This Example shows that the gelling properties of the polysilicate esters can be altered by aging.

The procedures of Example 9 were repeated except that the butylpolysilicate had been aged at room temperature about 9 weeks after preparation. On injection, a pressure drop of about 13.8 kPa (2 psi) developed almost immediately. After a two hour shut-in period, brine injection at 12 ft/day resulted in a pressure drop in excess of 207 kPa (30 psi), much greater than that observed in Example 9 with freshly prepared material. The explanation probably involves an increase in the polysilicate molecular weight for this partially substituted ester. Incidental contact with water may have also contributed.

When the procedures were repeated at 75° C., with a butylpolysilicate that had been aged about 6 weeks, the sandpack pressure drop reached 62 kPa (9 psi) after about 0.5 PV of the ester had been injected. After the injection of 1 PV total polysilicate, the sandpack was shut in for 16 hours. A 22% brine was then injected at 12 ft/day. The pressure drop exceeded 207 kPa (30 psi).

I claim:

1. A method of recovering hydrocarbon oil from a subterranean, oil-bearing formation comprising the following steps:
   (i) acidifying an aqueous solution of an alkali metal silicate,
   (ii) reacting the product of step (i) with an organic, hydroxyl group-containing compound,
   (iii) injecting the polysilicate product of step (ii) into the high permeability region or regions of the formation to plug the high permeability region or regions,
   (iv) injecting into the formation a flooding liquid, and
   (v) recovering the oil from the formation.

2. A method according to claim 1 including the step of causing the formation of a siliceous gel in the formation subsequent to the injection of the polysilicate.

3. A method according to claim 1 in which the alkali metal silicate comprises sodium silicate.

4. A method according to claim 1 in which the organic, hydroxyl group-containing compound comprises an aliphatic monohydroxylic alcohol.

5. A method according to claim 4 wherein the aliphatic monohydroxylic alcohol is methyl, ethyl, n-propyl, iso-propyl, n-butyl, sec-butyl, or tert-butyl alcohol.

6. A method according to claim 5 wherein the aliphatic monohydroxylic alcohol is n-butyl alcohol.

7. A method according to claim 1 in which the organic, hydroxyl group-containing compound comprises an aliphatic diol.

8. A method according to claim 1 in which the organic, hydroxyl group-containing compound comprises a polyol.

9. A method according to claim 1 in which the organic, hydroxyl group-containing compound comprises an alkoxy ether.

10. A method according to claim 1 in which the polysilicate product injected into the formation is used in an amount equivalent to 10 to 100% of the pore volume of the zone to be treated.

11. A method according to claim 10 wherein the flooding liquid is water.

12. A method of recovering hydrocarbon oil from a subterranean oil-bearing formation comprising:
   (a) injecting into the high permeability region or regions of the subterranean formation a permeability control agent comprising a liquid polysilicate ester, produced by the reaction of a hydroxyl group-containing organic compound with the product obtained by acidifying an alkali metal silicate, to plug the high permeability region or regions, (b) subsequently injecting into the formation a flooding liquid, and (c) recovering the oil from the formation.

13. A method according to claim 12 in which the organic polysilicate ester is an ester of an alkanol.

14. A method according to claim 13 wherein the organic polysilicate ester is an ester of an alcohol.

15. A method according to claim 14 wherein the alcohol is methyl, ethyl, n-propyl, iso-propyl, n-butyl, sec-butyl, or tert-butyl alcohol.

16. A method according to claim 15 wherein the alcohol is n-butyl alcohol.

17. A method according to claim 12 in which the polysilicate ester is an ester of an organic polyol.

18. A method according to claim 12 in which the polysilicate ester is an ester of a glycol.

19. A method according to claim 12 in which the polysilicate ester is an ester of a hydroxyl-containing glycol oligomer.

20. A method according to claim 12 wherein the flooding liquid is water.

* * * * *

UNITED STATES PATENT AND TRADEMARK OFFICE
CERTIFICATE OF CORRECTION

PATENT NO. : 4,660,640

DATED : April 28, 1987

INVENTOR(S) : D. H. Hoskin and L. D. Rollmann

It is certified that error appears in the above-identified patent and that said Letters Patent is hereby corrected as shown below:

Column 4, line 42, delete "regions" and insert --region-- therefor.
Column 4, line 53, after "prevented" insert --.--.
Column 6, line 55, delete "volum" and insert --volume-- therefor.

Signed and Sealed this

Eighteenth Day of July, 1989

Attest:

DONALD J. QUIGG

*Attesting Officer*   *Commissioner of Patents and Trademarks*